United States Patent
Chandraker et al.

(10) Patent No.: US 9,600,897 B2
(45) Date of Patent: Mar. 21, 2017

(54) TRAJECTORY FEATURES AND DISTANCE METRICS FOR HIERARCHICAL VIDEO SEGMENTATION

(71) Applicant: NEC Laboratories America, Inc., Princeton, NJ (US)

(72) Inventors: Manmohan Chandraker, Santa Clara, CA (US); Du Tran, San Jose, CA (US)

(73) Assignee: NEC Corporation (JP)

( * ) Notice: Subject to any disclaimer, the term of this patent is extended or adjusted under 35 U.S.C. 154(b) by 228 days.

(21) Appl. No.: 14/525,262

(22) Filed: Oct. 28, 2014

(65) Prior Publication Data
US 2015/0116597 A1    Apr. 30, 2015

Related U.S. Application Data

(60) Provisional application No. 62/035,647, filed on Aug. 11, 2014, provisional application No. 62/035,659, (Continued)

(51) Int. Cl.
*G06T 7/20* (2006.01)
*H04N 5/14* (2006.01)

(52) U.S. Cl.
CPC ............ *G06T 7/2006* (2013.01); *G06T 7/215* (2017.01); *G06T 7/269* (2017.01); *H04N 5/145* (2013.01); *H04N 5/147* (2013.01); *G06T 2207/10016* (2013.01); *G06T 2207/10024* (2013.01); *G06T 2207/20016* (2013.01); *G06T 2207/20076* (2013.01); *G06T 2207/20081* (2013.01); *G06T 2207/30241* (2013.01)

(58) Field of Classification Search
CPC . G06T 2207/10016; G06T 2207/10024; G06T 2207/20016; G06T 2207/20076; G06T 2207/20081; G06T 2207/30241; G06T 7/2006; G06T 7/2066; H04N 5/145; H04N 5/147
USPC .......................................................... 348/699
See application file for complete search history.

(56) References Cited

U.S. PATENT DOCUMENTS

| | | | |
|---|---|---|---|
| 6,760,488 B1 * | 7/2004 | Moura ................. | G06T 7/0071 345/419 |
| 7,587,064 B2 * | 9/2009 | Owechko ............ | G06K 9/6254 382/103 |

(Continued)

OTHER PUBLICATIONS

Wayback machine timestamped of the document above by Grundmann showing date Jun. 18, 2013.*

(Continued)

*Primary Examiner* — Jamie Atala
*Assistant Examiner* — James Boylan
(74) *Attorney, Agent, or Firm* — Joseph Kolodka (57) ABSTRACT

A method to perform hiearchical video segmentation includes: defining voxels over a spatio-temporal video; grouping into segments contiguous voxels that display similar characteristics including similar appearance or motion; determining a trajectory-based feature that complements color and optical flow cues, wherein trajectory cues are probabilistically meaningful histograms combinable for use in a graph-based framework; and applying a max-margin module for cue combination that learns a supervised distance metric for region dissimilarity that combines color, flow and trajectory features.

15 Claims, 8 Drawing Sheets

--- defining voxels over a spatio-temporal video;

grouping into segments contiguous voxels that display similar characteristics including similar appearance or motion;

determining a trajectory-based feature that complements color and optical flow cues, wherein trajectory cues are probabilistically meaningful histograms combinable for use in a graph-based framework;

applying a max-margin module for cue combination that learns a supervised distance metric for region dissimilarity that combines color, flow and trajectory features

Related U.S. Application Data filed on Aug. 11, 2014, provisional application No. 61/897,851, filed on Oct. 31, 2013.

(56) References Cited

U.S. PATENT DOCUMENTS

| | | | | |
|---|---|---|---|---|
| 2010/0169330 A1* | 7/2010 | Albers | ............. | G06F 17/30831 707/754 |
| 2012/0027304 A1* | 2/2012 | Brown | ............... | G06K 9/00369 382/190 |
| 2015/0023557 A1* | 1/2015 | Yoo | ..................... | G06K 9/6282 382/103 |

OTHER PUBLICATIONS

Grundmann et al., "Efficient Hierarchical Graph-Based Video Segmentation" Georgia Institute of Technology, http://www.cc.gatech.edu/cpl/projects/videosegmentation.*

Grundmann et al, Efficient Hierarchical Graph Based Video Segmentation, 2013, available at http://www.cc.gatech.edu/cpl/projects/videosegmentation.

* cited by examiner

| |
|---|
| defining voxels over a spatio-temporal video; |
| grouping into segments contiguous voxels that display similar characteristics including similar appearance or motion; |
| determining a trajectory-based feature that complements color and optical flow cues, wherein trajectory cues are probabilistically meaningful histograms combinable for use in a graph-based framework; |
| applying a max-margin module for cue combination that learns a supervised distance metric for region dissimilarity that combines color, flow and trajectory features |

Cluster trajectories in each frame into k clusters, let cluster centers be $c_j$. Soft quantization to assign probability for a trajectory:

$$p(t|c_j) = \frac{1}{Z_t} e^{-\frac{\|t-c_j\|^2}{\sigma}}$$

Assuming independence, probability of a segment S is:

$$p(S|c_j) = \prod_{t \in S} \frac{1}{Z_t} e^{-\frac{\|t-c_j\|^2}{\sigma}} = \frac{\prod_{t \in S} e^{-\frac{\|t-c_j\|^2}{\sigma}}}{\prod_{t \in S} Z_t}$$

Since small numbers are involved, take logarithms:

$$\log p(S|c_j) = -\frac{1}{\sigma} \sum_{t \in S} \|t - c_j\|^2 - \sum_{t \in S} \log Z_t .$$

These are un-normalized, but merging is efficient since we can just combine the distances and the normalization.

To be probabilistically meaningful in distance computation, must be normalized.

$$q_k = \log p(S|c_k) \text{ , where } p(S|c_k) = \frac{e^{q_k}}{\sum_{j=1}^{k} e^{q_j}}$$

Each number in above is very small, so we avoid numerical issues by a log-trick:

$$\log p(S|c_k) = q_k - \log \sum_{j=1}^{k} e^{q_j} = q_k - \mu - \log \sum_{j=1}^{k} e^{(q_j - \mu)} \text{ , where } \mu = \max_i q_i$$

- Trajectories start at interest points (Harris corners). Tracked using a median-filtered optical flow.

- 101 *Trajectory shape cue:* At a frame $z$, we consider trajectories that have length at least $L+1$, that is, have been tracked through frames $z-L, \ldots, z-1, z$. The trajectory cue is defined as the $2L$-dimensional displacement vector $\{(x_i - x_{i-1}, y_i - y_{i-1})\}_{i=z-L...z}$.

- 102 *Trajectory length cue:* With the assumption that voxels from the same region have similar depths and undergo similar rigid body motions, we expect their trajectories to have similar lengths. Thus, we use the geometric lengths of trajectories as a rough indicator of motion and depth differences.

FIG. 2C

We now show that it is possible to learn an effective and physically meaningful cue combination in a max-margin framework. In this setting, we assume that we have an annotated training set of $N$ examples of the form $e = (S_i, S_j, y_{ij})$, with $i \neq j$. The pair of segments $S_i, S_j$ that constitute $e$ are neighbours (that is, linked by a finite weight edge) and $y_{ij} \in \{1, -1\}$ indicates whether $S_i$ and $S_j$ belong to the same or different segment, respectively, in the ground truth annotation.

The feature representation $\phi(S)$ for a segment $S$ is simply the stacked up histograms from all the individual cues. We can now learn the feature weighting as a linear combination $w^T |\phi(s_i) - \phi(s_j)|$, where the optimal weight $w^*$ is determined by solving an optimization problem of the form:

$$\min_{w, \xi_{ij}} \frac{1}{2} w^T w + \frac{\lambda}{N_+} \sum_{ij} \xi_{ij} + \frac{\lambda}{N_-} \sum_{ij} \xi_{ij}$$

$$\text{s.t.} \quad y_{ij} w^T |\phi(s_i) - \phi(s_j)| \leq 2y_{ij} - 1 + \xi_{ij}, \forall i, j$$

$$w \geq 0, \xi_{ij} \geq 0.$$

Naive Bayes approach models the edge weights of the graph using probabilistic estimations. Omitting data term and assuming the independence between all cues $c \in C$ given class labels, the probability of boundary $y_{ij}$ given a pair of segments $(S_i, S_j)$ is model as in Eq. 11. For notation convenience, we denote $y_{ij} = 1$ if $S_i$ and $S_j$ belongs to the same class (e.g. no boundary between them), 0 otherwise.

$$P(y_{ij}|s_i, s_j) \propto P(y_{ij}) \prod_{c \in C} P(\phi_c(S_i), \phi_c(S_j)|y_{ij}) \quad (11)$$

with the class-dependent likelihood as in Eq. 12 with $d_c = \chi^2(\phi_c(S_i), \phi_c(S_j))$ is the $\chi^2$ distance of two segments using cue $c$.

$$P(\phi_c(S_i), \phi_c(S_j)|y_{ij} = 1) = \lambda_{1c} e^{-\lambda_{1c} d_c}$$
$$P(\phi_c(S_i), \phi_c(S_j)|y_{ij} = 0) = \lambda_{0c} e^{-\lambda_{0c} d_c} \quad (12)$$

We model the priors $P(y_{ij})$ as soft counting. The parameters $\lambda_{1c}, \lambda_{0c}$ are estimated using maximum likelihood with closed-form solutions $\lambda_{1c} = \frac{1}{\bar{d}_c(y_{ij}=1)}$ and $\lambda_{0c} = \frac{1}{\bar{d}_c(y_{ij}=0)}$ where $\bar{d}_c(y_{ij} = 1)$ and $\bar{d}_c(y_{ij} = 0)$ are the mean values of $d_c$ given class $y_{ij}$ is observed. Finally, the edges are modeled as the normalized probability of $P(y_{ij} = 0|S_i, S_j)$ e.g. probability of boundary given two segments.

TRAJECTORY FEATURES AND DISTANCE METRICS FOR HIERARCHICAL VIDEO SEGMENTATION

This application claims priority to Provisional Application Ser. Nos. 61/897,851 filed Oct. 31, 2013, 62/035,647 filed Aug. 11, 2014, 62/035,659 filed Aug. 11, 2014.

BACKGROUND

Rapidly evolving technologies for acquiring and sharing video data make video analysis an increasingly relevant problem. Segmentation of a video into spatio-temporally consistent regions is a core concern of early vision, with many applications like summarization, compression and scene understanding. However, it remains a significant challenge. This is partly due to the difficulty of tractably scaling image segmentation approaches to more complex video data, where several recent works have made important progress. However, another important aspect, namely development of better features specifically designed for video segmentation and their combination in a principled framework, is not well-addressed yet.

Temporal coherence is the key distinction between videos and static images. Conceptually, motion field between images is the physical manifestation of temporal coherence. Optical flow is an efficient approximation to the motion field. Not only does optical flow establish a temporal connection between voxels, but also motion change is an important indicator of a segmentation boundary. Consequently, many video segmentation methods employ optical flow as a key cue that captures motion information. The graph-based hierarchical (GBH) segmentation method which performs the best among current methods uses histogram features of color and optical flow.

Video segmentation inherently involves combination of different feature channels—the two most evident ones being based on appearance and motion. An effective distance metric between regions combines multiple cues in a way that boosts the segmentation performance over that achievable by individual cues. Clearly, this distance metric has an important effect on segmentation quality and the importance increases for greater number of feature channels. The framework uses a straightforward multiplicative combination of individual distances with good results.

As undersegmentation error is biased to treat small and large segments differently, the system corrects for this by proposing a normalized undersegmentation error. Our features and their combinations are evaluated over the various metrics, on several different datasets including the large-scale scene data. In each case, we observe that our learned feature combinations that include trajectory cues achieve better segmentation quality than existing systems.

A popular approach to superpixel segmentation of images initially puts each node (pixel) in its own region, with an edge between neighboring regions encoding their dissimilarity. For a region R, its internal variation $Int(R)$ is defined as the heaviest edge weight of its minimum spanning tree. The edges are traversed in non-decreasing order. Regions $R_i$ and $R_j$ linked by an edge of weight $w_{ij}$ are merged if there is no evidence of a boundary. A boundary is deemed present if $$w_{ij} \geq \min\left\{Int(R_i) + \frac{k}{|R_i|}, Int(R_j) + \frac{k}{|R_j|}\right\}, \quad (1)$$

where $|R|$ denotes size of region R and k is a parameter that roughly controls the segment size. Sorting makes the overall complexity $O(m \log n)$ for a graph with m edges and n nodes and the subsequent segmentation is nearly $O(m)$.

The graph-based paradigm is extended to segment videos in a graph-based hierarchical (GBH) framework. At the lowest level, a graph is constructed where each voxel represents a vertex. Iteratively, the graph at a level is partitioned and the resulting regions are used as vertices to construct the graph at the next higher level (called region graphs). The size parameter k is scaled by a constant factor $s>1$ for each level higher in the hierarchy.

At the lowest level, absolute color (in RGB space) difference is used to model the dissimilarity between voxels. For higher levels, histogram-based features encode dissimilarities between regions:

Color Histogram:

This feature captures appearance information. It is defined as the $\chi^2$-distance between color histograms (in Lab color space) of two regions. Regions often appear across multiple frames in the video and the color histograms are computed using voxels in all the frames where a region appears.

Histogram of Optical Flows:

This feature captures motion information. Optical flows are only consistent within the same frame, so a $\chi^2$-distance between flow histograms within the same frame is computed. If two regions appear in N frames, their distance is defined as the average of the $\chi^2$-distances in the N frames. itemize While flow histograms capture some motion information, longer range trajectories can provide a stronger cue. However, unlike color and flow, trajectories are not per-pixel entities, so it is not immediately clear how they can be encoded into histogram-based features consistent with the above features. The first contribution of this paper is to do so in a probabilistically meaningful and efficient manner.

To assign a single distance metric between regions, the GBH framework uses an intuitive combination:

$$d=(1-(1-d_c)(1-d_f))^2 \quad (2)$$

where $d_c, d_f$ are the above-mentioned distances based on color and flow histograms. This combination has some desirable properties, for instance, d is normalized within [0,1] and its value is high unless two regions are similar with respect to both the cues. However, two important drawbacks are that this combination is not probabilistically meaningful and does not reflect the relative importance of each cue.

SUMMARY

In one aspect, a scalable extension of the graph-based hierarchical (GBH) framework for video segmentation. The system includes a trajectory-based feature that complements traditional color and optical flow cues by incorporating long-range and robust motion information. The trajectory cues are probabilistically meaningful histograms that are designed to be efficiently combinable for use in a graph-based framework where region merging is the computational bottleneck. The system a max-margin approach for cue combination that learns a supervised distance metric for region dissimilarity that combines color, flow and trajectory features in a way that is physically meaningful.

Advantages of the system may include one or more of the following. The system is more accurate since we use features that are more representative of true scene motions. The system provides higher quality: we learn distance metrics to combine cues optimally, rather than heuristically. The system is faster: our cues are efficiently usable in a GBH framework and our randomized segmentation algorithm is faster.

DESCRIPTION

Figure 1:
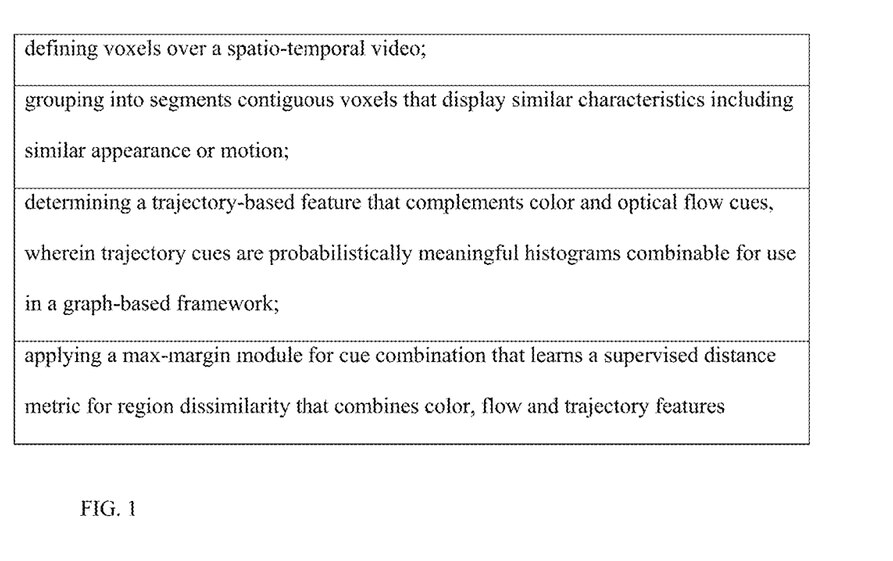
FIG. 1 shows an exemplary process for hiearchical video segmentation.
Figure 2A:
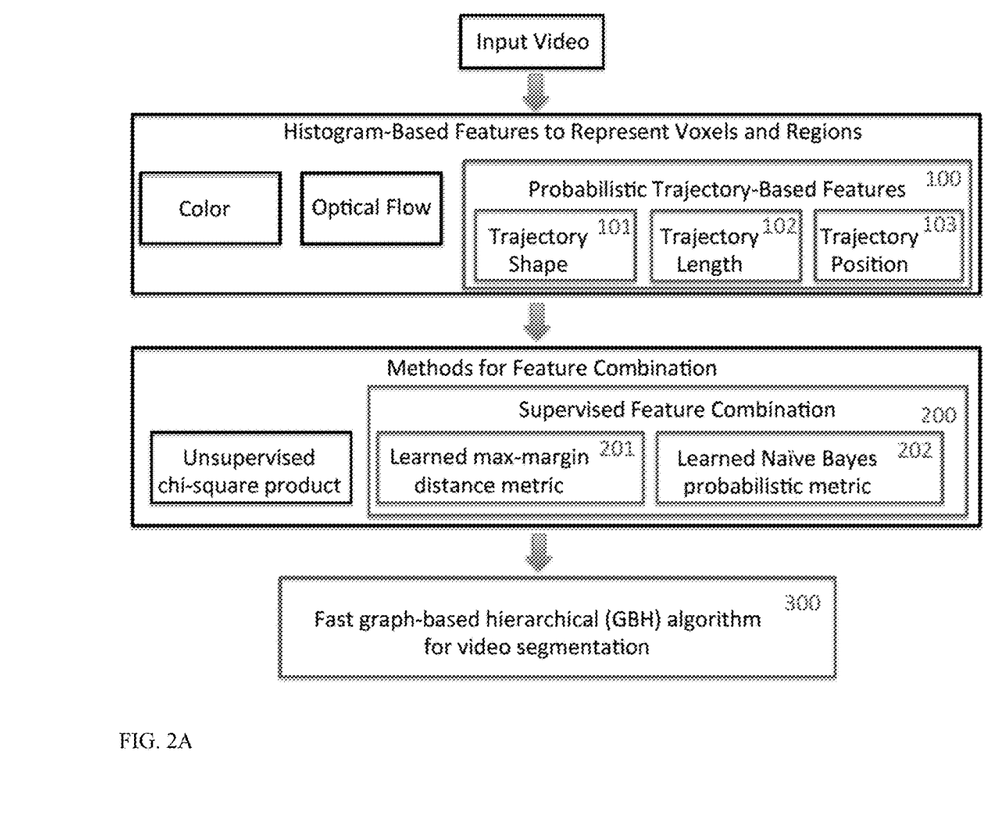
FIGS. 2A-2F show an exemplary system for hiearchical video segmentation.
Figure 2B:
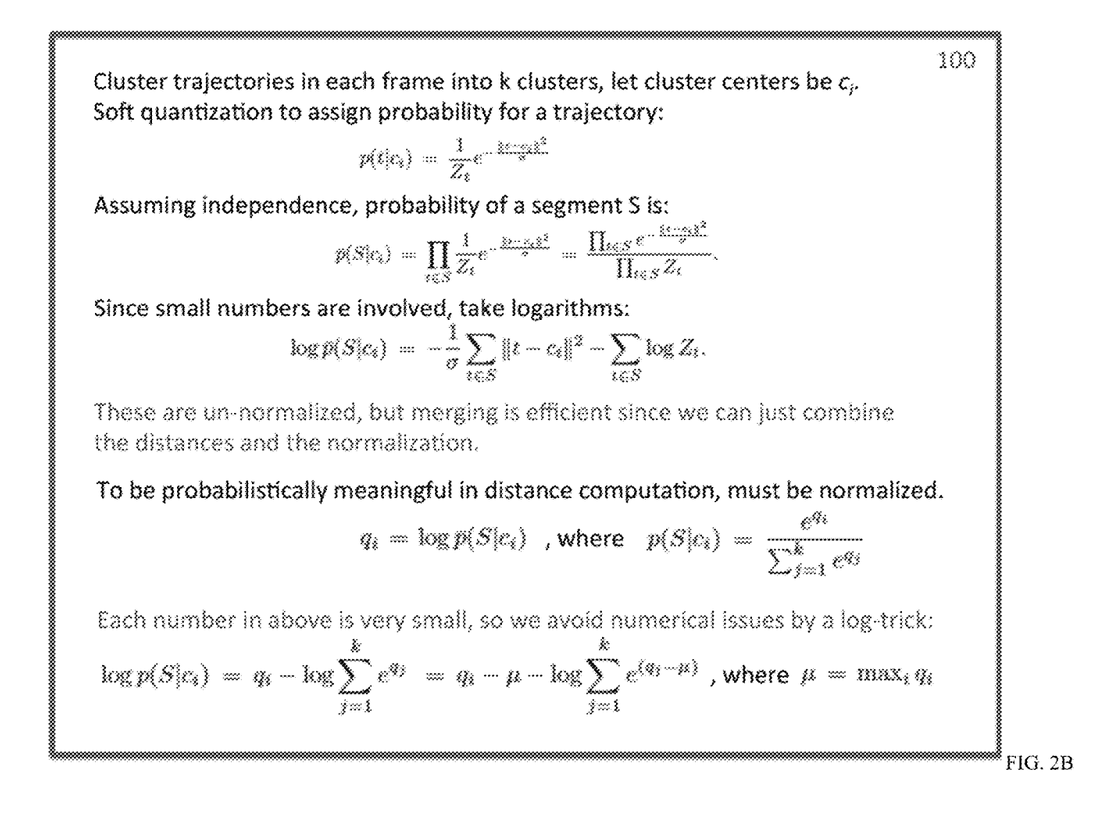
Figure 2C:
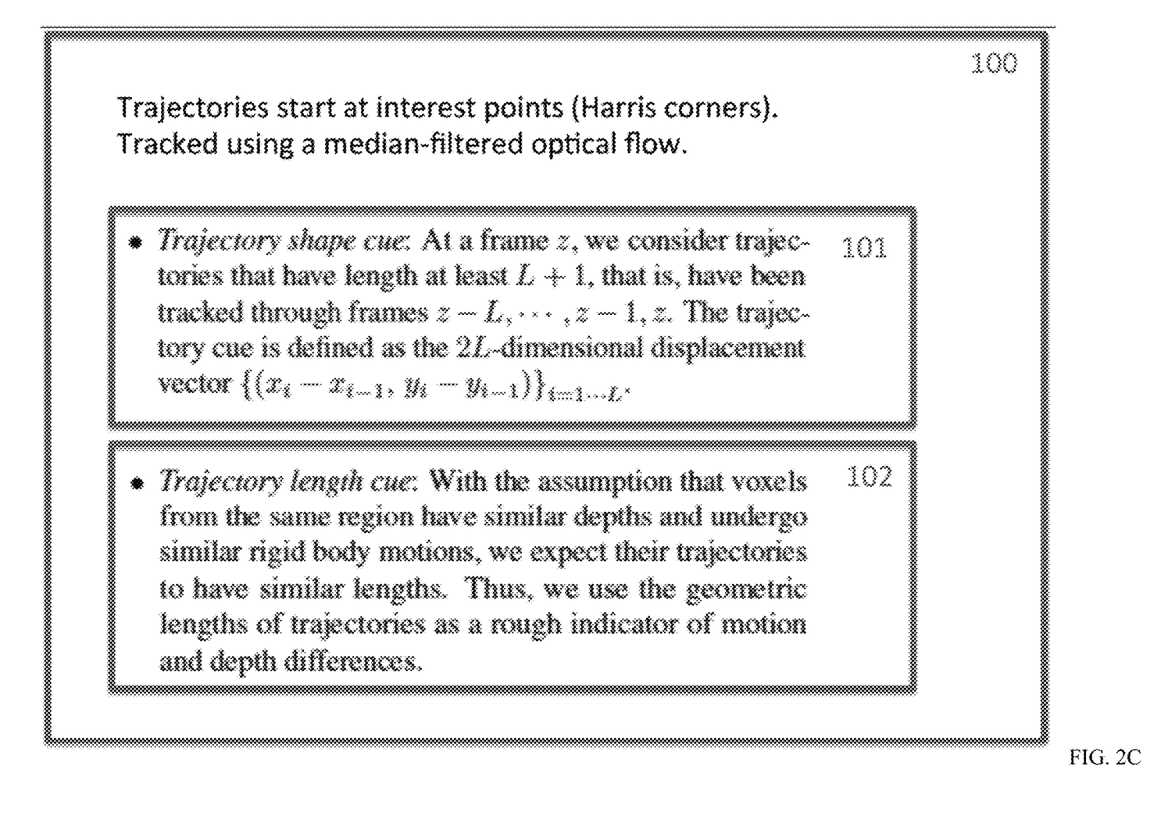
Figure 2D:
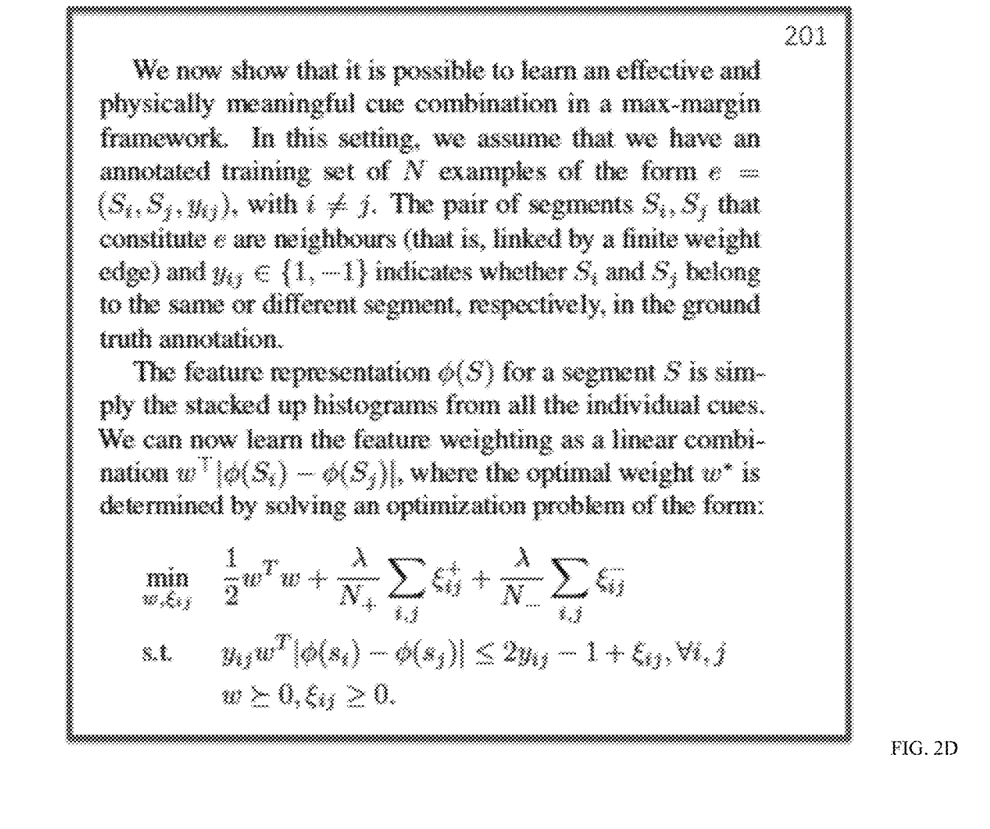
Figure 2E:
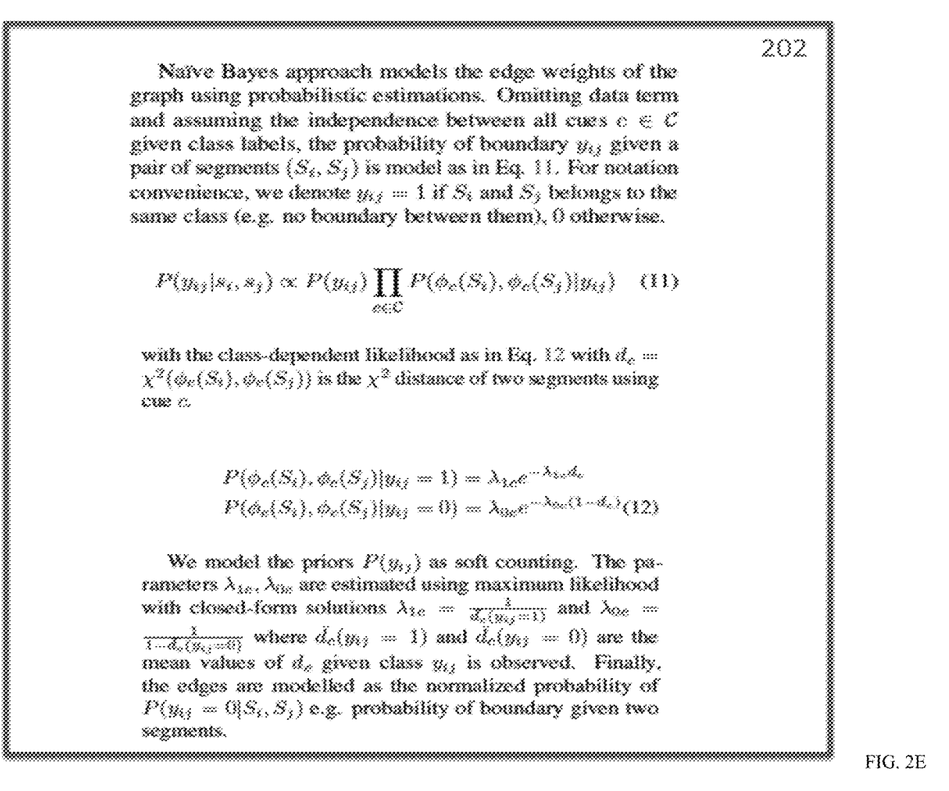
Figure 2F:
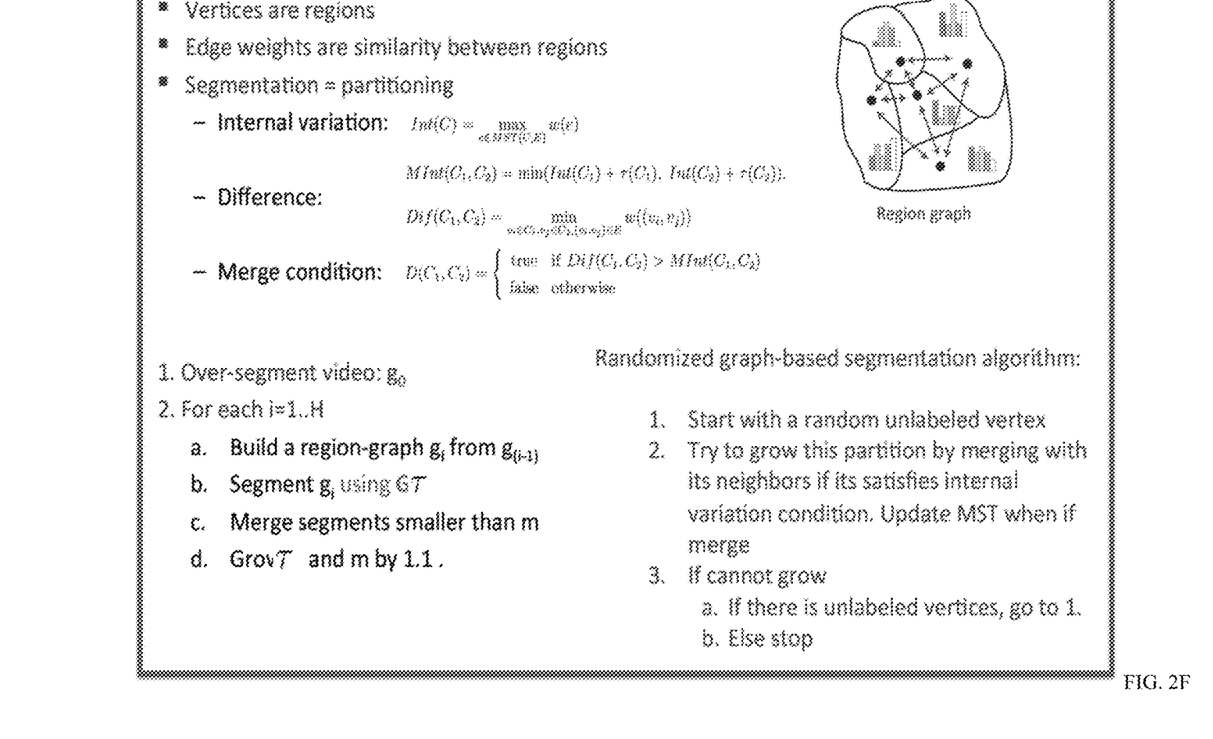
Figure 3:
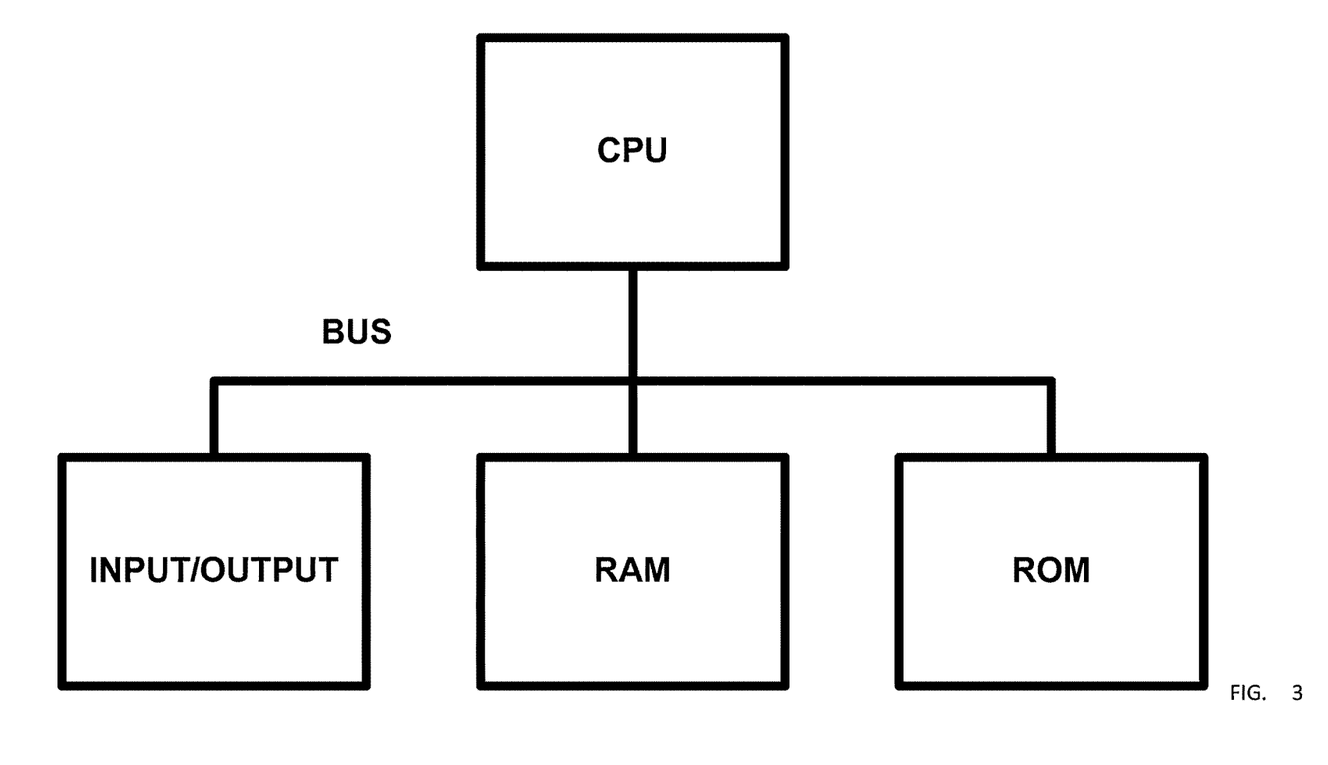
FIG. 3 shows an exemplary computer system for video segmentation.

FIG. 1 shows an exemplary method to perform hiearchical video segmentation using a computer and a camera. We solve the problem of video segmentation. Rather than individually segmenting a series of images, we define voxels over the spatio-temporal video. Contiguous voxels that display similar characteristics, such as similar appearance or similar motion, are then grouped into segments. The method includes:

defining voxels over a spatio-temporal video;
grouping into segments contiguous voxels that display similar characteristics including similar appearance or motion;
determining a trajectory-based feature that complements color and optical flow cues, wherein trajectory cues are probabilistically meaningful histograms combinable for use in a graph-based framework; and
applying a max-margin module for cue combination that learns a supervised distance metric for region dissimilarity that combines color, flow and trajectory features.

The system incorporates features based on point trajectories. Trajectory estimation usually involves robust tracking mechanisms, so they often provide a stronger motion cue than concatenation of noisy optical flows. The instant method uses point trajectories to link voxels over space-time and define an affinity measure for spectral clustering, which is time-consuming and cannot segment static objects.

The system uses new features, new methods of feature combination and faster algorithms. Prior work uses only color and optical flow based features. We observe that trajectories are truer representation of the object motion, so use their use as features. We represent trajectories as probabilistically meaningful histogram features. Our feature construction ensures that our histogram-based features can be efficiently used in a graph-based hierarchical segmentation.

FIGS. 2A-2F show an exemplary system for hiearchical video segmentation that uses a novel max-margin distance metric for video segmentation and combines various feature channels in a meaningful way. We use a novel naïve Bayes distance for video segmentation that provides a probabilistically meaningful framework to combine feature channels. A randomized speed-up of the traditional graph-based segmentation algorithm can be used. This process has a number of applications, such as:

(a) Video summarization
(b) Detecting objects in videos
(c) Video analysis
(d) Scene understanding
Reviewing FIGS. 2A-2F together:
(100) We use to use point trajectories as features for video segmentation. This has a benefit over using simple flow-based features since trajectories are more robust. Our trajectory construction is not expensive like prior works.
(101) We use a framework for constructing histogram-based trajectory shape features that is probabilistically meaningful. It is crucial that the features be efficient to merge for use in a hierarchical graph-based framework and our features achieve that.
(102) We additionally use the length of a trajectory as a pseudo-depth and motion magnitude indicator. This has benefits since it can be expected that various points on an object are at roughly the same distance from the camera and undergo motions of similar magnitudes.
(103) We also use trajectory positions as a cue, since trajectories physically close to each other are likely to belong to the same object.
(200) We use principled machine learning algorithms to determine distance between two regions, based on combining their color, flow and trajectory features. Unlike prior works, our methods are supervised to better exploit the characteristics of training data.
(201) We use a max-margin distance metric learning framework for combining color, flow and trajectory features. A weight is learned for each feature dimension, which leads to a more optimal combination than simply assigning a uniform weight to each.
(202) We use a naïve Bayes probabilistic model for region dissimilarity that combines color, flow and trajectory in a manner that reflects their effectiveness in training data.
(300) We use a randomized version of the traditional graph-based segmentation algorithm that achieves significant speed-ups in practice.

In one embodiment, the key steps include:
(a) use trajectories to better capture motion field of various points in the video
(b) define a probabilistically meaningful histogram-based feature representation for trajectories
(c) use an efficient mechanism to combine our histogram features within a graph-based hierarchical segmentation framework
(d) use a supervised max-margin distance metric learning to meaningfully combine the color, flow and trajectory cues
(e) use a supervised naïve Bayes model that assigns region dissimilarities that combines color, flow and trajectory cues in a manner that reflects the distributions in training data
(f) use a randomized segmentation algorithm that achieves significant speed-up in practice.

The system uses trajectories to construct efficient histogram-based features that can be incorporated into the GBH framework. While color and flow are per-pixel entities, an effective representation of trajectories as quantized histogram features is not straightforward. The present system uses a principled approach for combining color, flow and trajectory-based features in a GBH framework, which relies on machine learning to explicitly account for the relative importance of each cue. Our approach learns a max-margin distance metric based on training data. Interestingly, the weights learned by this framework lend valuable physical insight—we observe that appearance cues always dominate the segmentation metric, but the relative importance of motion cues consistently increases as we move to higher levels of the segmentation hierarchy. We evaluate our features and metrics on several public datasets to show the advantages of both our trajectory cues and the learned distance metrics. Our experiments show that our learned distance metrics significantly outperform conventional systems. Our supervised method outperforms the unsupervised metric used in traditional GBH frameworks.

Trajectory Features for Video Segmentation is used to capture long-range motions, for which trajectories are a more reliable cue than per-frame concatenation of optical flows. Further, robust tracking mechanisms employed in trajectory construction make them better cues than optical flow, which tends to be noisy.

Our trajectories start at interest points (Harris corners), which are then tracked using a robust median filtered optical flow at multiple scales. Instead of refreshing tracks every fixed number of frames, we let the trajectories evolve until they shrink to non-corner points. For simplicity, we will henceforth denote by (x, y, z) the trajectory that ends at pixel location (x, y) in frame z.

The following information is extracted from the trajectories constructed as above:

Trajectory Shape Cue:

At a frame z, we consider trajectories that have length at least L+1, that is, have been tracked through frames z−L, . . . , z−1, z. The trajectory cue is defined as the 2 L-dimensional displacement vector $\{(x_i-x_{i-1}, y_i-y_{i-1})\}_{i=1 \ldots L}$.

Trajectory Length Cue:

With the assumption that voxels from the same region have similar depths and undergo similar rigid body motions, we expect their trajectories to have similar lengths. Thus, we use the geometric lengths of trajectories as a rough indicator of motion and depth differences.

Unless stated otherwise, the term "trajectory cue" will be used henceforth as a shorthand for "trajectory shape cue".

Note that the length cue is not a true representation of scene depth. For instance, a fast-moving object far away might have similar trajectory lengths as a slow-moving object close to the camera. Nevertheless, many segmentation scenarios involve objects undergoing motions of similar magnitudes—for example, crowded pedestrian scenes or traffic scenes with moving cars. Thus, including this cue leads to a slight performance improvement in our experiments. We also note that when camera calibration is available, this can be easily converted into a true depth cue.

Another consideration is that instead of representing a trajectory by raw displacements, a higher-order representation of trajectory shape may be used. For instance, either parametric shape information like curvature, or a spline-fit might be used. Such a representation might allow further robustness, however, we do not use them to avoid the computational burden that stems from the vast number of trajectories (several hundred thousands) that typical videos encompass.

For consistency with the color and flow cues in the GBH framework, it is desirable to construct histogram-based features for the trajectory cues too. Like optical flow, histogram features of trajectory shape and length will only be consistent within the same frame. Thus, the between-region distance for these features is the average over the frame-based $\chi^2$-distances of trajectory shape and length histograms.

Constructing a histogram-based feature from quantized depth values is straightforward. However, it is challenging to represent trajectory shape in such a way that it precisely estimates the similarity between regions, while also allowing efficient region mergers when moving up the GBH segmentation hierarchy. In the following section, we present a probabilistic meaningful representation of trajectories that allows computationally efficient mergers while also coping with the involved numerical issues.

An initial approach to represent trajectories could be to adopt the bag-of-words paradigm, using an online codebook of trajectories at each frame. However, in order to precisely estimate the similarity between regions, a large codebook is required. This significantly increases the memory requirement as we need a histogram for each region, at every frame. As a compromise between accuracy and memory requirements, we use a soft-quantization of trajectories.

We cluster the trajectories within each frame into k clusters centered at for i=1, . . . , k. For a trajectory t∈R$^{2L}$, we define its probability given a center $c_i$ as:

$$p(t \mid c_i) = \frac{1}{Z_t} e^{-\frac{\|P t - c_i P\|^2}{\sigma}} \qquad (3)$$

where $$Z_t = \sum_{i=1}^{k} e^{-\frac{\|P t - c_i P\|^2}{\sigma}}$$

is the normalization and σ is a parameter that allows controlling the cluster spread. Assuming independence between trajectories, the un-normalized probability of a segment S (consisting of several trajectories) given $c_i$ is:

$$\overline{p}(S \mid c_i) = \prod_{t \in S} \frac{1}{Z_t} e^{-\frac{\|P t - c_i P\|^2}{\sigma}} = \frac{\prod_{t \in S} e^{-\frac{\|P t - c_i P\|^2}{\sigma}}}{\prod_{t \in S} Z_t}. \qquad (4)$$

We observe that $P_t-c_iP$ is a distance between vectors in a 2 L dimensional space (typically, L=15), thus, its negative exponentiation is usually a small number. Further, for segments at the higher levels of hierarchy, it is common to have tens of thousands of trajectories. Thus, the probability computation in 4 involves the multiplication of several very small numbers, which causes severe numerical problems. To avoid this problem, we consider logarithms:

$$\log \overline{p}(S \mid c_i) = -\frac{1}{\sigma} \sum_{t \in S} \|P t - c_i P\|^2 - \sum_{t \in S} \log Z_t. \qquad (5)$$

Now, we note that (5) allows us to efficiently compute the histogram of quantized trajectories for a segment within the hierarchical GBH framework. Indeed, at the lowest level, we simply compute the distances $|t-c_i|$, for i∈1 . . . k and subsequently compute log $Z_t$. For merging two regions, we simply sum up the distances to centers for trajectories belonging to the two regions and add the normalizations (log $Z_t$) for those two regions. With these values, we can efficiently obtain the un-normalized probability of the merged segment using (5).

However, recall that (5) is not normalized. While we retain the un-normalized values for efficient merging, they must be converted to a normalized probability for meaningful distance computation. Denoting $q_i = \log \bar{p}(S|c_i)$, the normalized probability of a segment S given $c_i$ is given by:

$$p(S|c_i) = \frac{e^{q_i}}{\sum_{j=1}^{k} e^{q_j}}. \quad (6)$$

Again, $q_i$ are big negative numbers, so a direct evaluation of the above probability leads to numerical problems. To address this issue, let us denote $\mu = \max_i q_i$. Then, we observe that $$\log p(S|c_i) = q_i - \log \sum_{j=1}^{k} e^{q_j} \quad (7)$$

$$= q_i - \mu - \log \sum_{j=1}^{k} e^{(q_j - \mu)}. \quad (8)$$

Finally, $p(S|c_i)$ is obtained simply by exponentiating (8). Thus, we have obtained a probabilistically meaningful representation of the trajectory cue for a segment, which is simultaneously efficient for histogram mergers that are the most frequent operations in the graph-based hierarchical segmentation framework.

Next, cues are combined for segmentation. The system includes distances from the trajectory shape and length cues, denoted by $d_t$ and $d_l$, respectively:

$$d = [1-(1-d_c)(1-d_f)(1-d_t)(1-d_l)]^2. \quad (9)$$

This distance is intuitive and easy to compute, however, a significant drawback is that relative importances of the feature channels are not accounted for. This issue becomes increasingly important as the number of cues used increases. The learned metrics of the following two sections address this issue.

Max-Margin Distance Metric will be discussed next. We now show that it is possible to learn an effective and physically meaningful cue combination in a max-margin framework. In this setting, we assume that we have an annotated training set of N examples of the form $e=(S_i, S_j, y_{ij})$, with $i \neq j$. The pair of segments $S_i, S_j$ that constitute e are neighbours (that is, linked by a finite weight edge) and $y_{ij} \in \{1,-1\}$ indicates whether $S_i$ and $S_j$ belong to the same or different segment, respectively, in the ground truth annotation.

The feature representation $\phi(S)$ for a segment S is simply the stacked up histograms from all the individual cues. We can now learn the feature weighting as a linear combination $w^T |\phi(S_i) - \phi(S_j)|$, where the optimal weight $w^*$ is determined by solving an optimization problem of the form:

$$\min_{w, \xi_{ij}} \frac{1}{2} w^T w + \frac{\lambda}{N_+} \sum_{i,j} \xi_{ij}^+ + \frac{\lambda}{N_-} \sum_{i,j} \xi_{ij}^- \quad (10)$$

$$\text{s.t.} \quad y_{ij} w^T |\phi(s_i) - \phi(s_j)| \leq 2y_{ij} - 1 + \xi_{ij}, \forall i, j$$

$$w \pm 0, \xi_{ij} \geq 0.$$

In the above, $\xi_{ij}$ denote slack variables and $\lambda$ is a soft margin trade-off parameter. $N_+$ and $N_-$ are the numbers of pairs of segments that have the same or different ground truth label ($N=N_+ + N_-$, with typically $\xi_{ij}^+$, $\xi_{ij}^-$ are slack variables with respective membership in those positive or negative sets.

The optimization has a similar form to that used for training a support vector machine (SVM), but with some important differences. First, we note that the weights w are constrained to be non-negative, since our features are physical histograms. Second, the number of constraints is very large—in the worst case, it is quadratic in the number of segments. For the lower levels of the segmentation hierarchy, this easily corresponds to a few hundred millions or billions of constraints. Thus, to solve the problem, we adopt the cutting-plane algorithm. Thanks to the problem's convexity, the algorithm normally converges within 20-30 iterations. It is worth noting that stochastic gradient descent is also applicable for solving this optimization.

The above learned weights constitute a linear combination of the feature dimensions. This already produces better results in our experiments than conventional systems. However, additional benefit may be obtained by a non-linear combination. For each feature channel, we average the learned weights. Let the averaged weights be $w_c$, $w_f$, $w_t$, and $w_l$ for the color, flow, trajectory shape and length channels. Then, we define a non-linear distance:

$$d = 1 - (1-d_c)^{w_c} (1-d_f)^{w_f} (1-d_t)^{w_t} (1-d_l)^{w_l}. \quad (11)$$

In our experiments, this non-linear combination gives a slight improvement over the linear max-margin combination.

We solve the problem of video segmentation. Rather than individually segmenting a series of images, we define voxels over the spatio-temporal video. Contiguous voxels that display similar characteristics, such as similar appearance or similar motion, are then grouped into segments. This process has several applications, such as:

(a) Video summarization
(b) Detecting objects in videos
(c) Video analysis
(d) Scene understanding Potential advantages of the system may include:

1. More accurate: since we use features that are more representative of true scene motions
2. Higher quality: we learn distance metrics to combine cues optimally, rather than heuristically
3. Faster: our cues are efficiently usable in a GBH framework and our randomized segmentation algorithm is faster.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A system to perform hierarchical video segmentation, comprising:
    a processor coupled to a camera;
    wherein the processor executes:
    defining voxels over a spatio-temporal video;
    grouping into segments contiguous voxels that display similar characteristics including similar appearance or motion;
    determining a trajectory-based feature that complements color and optical flow cues, wherein trajectory cues are probabilistic histograms combinable in a graph-based framework; and
    applying a max-margin cue combination that learns a supervised distance metric for region dissimilarity that combines color, flow and trajectory features;
    generating a max-margin distance metric for video segmentation that combines a plurality of feature channels;
    determining feature representation $\phi(S)$ for a segment S as a stacked up histograms from all the individual cues;
    learning feature weighting as a linear combination $w^T|\phi(S_i)-\phi(S_j)|$, where an optimal weight $w^*$ is determined by solving an optimization problem of the form:

$$\min_{w,\xi_{ij}} \frac{1}{2}w^T w + \frac{\lambda}{N_+}\sum_{i,j}\xi_{ij}^+ + \frac{\lambda}{N_-}\sum_{i,j}\xi_{ij}^-$$

$$\text{s.t.} \quad y_{ij}w^T|\phi(s_i)-\phi(s_j)| \le 2y_{ij}-1+\xi_{ij}, \forall i,j$$

$$w \pm 0, \xi_{ij} \ge 0,$$

where $\xi_{ij}$ denote slack variables and $\lambda$ is a soft margin trade-off parameter, $N_+$ and $N_-$ are the number of pairs of segments that have the same or different ground truth label and $\xi_{ij}^+$, $\xi_{ij}^-$ are slack variables with respective membership in those positive or negative sets.

2. The system of claim 1, comprising representing trajectories as probabilistic histogram features.

3. The system of claim 1, comprising generating histogram-based features in a graph-based hierarchical segmentation.

4. The system of claim 1, comprising applying a naive Bayes distance for video segmentation that provides a probabilistic framework to combine a plurality of feature channels.

5. The system of claim 1, comprising a speed-up of the graph-based segmentation.

6. The system of claim 1, comprising:
    starting the trajectories at interest points;
    tracking the trajectories using a median filtered optical flow at multiple scales;
    evolving the trajectories until the trajectories shrink to non-corner points; and
    extracting a shape cue and length cue from each trajectory.

7. The system of claim 1, wherein (x, y, z) is a trajectory that ends at pixel location (x,y) in frame z, comprising:
    extracting the shape cue at a frame z by considering trajectories that have length at least L+1 and tracked through frames z-L, . . . , z-1, z; and
    defining a trajectory cue as the 2L-dimensional displacement vector $\{(x_i-x_{i-1},y_i-y_{i-1})\}_{i=1\ldots L}$.

8. The system of claim 1, comprising using geometric lengths of trajectories as an indicator of motion and depth differences for the length cue.

9. The system of claim 1, comprising combining cues for segmentation by determining distances from the trajectory shape and length cues, denoted by $d_t$ and $d_l$, respectively:

$$d=[1-(1-d_c)(1-d_f)(1-d_t)(1-d_l)]^2.$$

10. The system of claim 1, comprising generating learned weights as a linear combination of feature dimensions.

11. The system of claim 1, comprising generating learned weights as a linear combination of feature dimensions.

12. The system of claim 11, comprising generating a probabilistic representation of the trajectory cue for a segment, wherein the representation is also used for histogram mergers in a graph-based hierarchical segmentation framework.

13. A method to perform hierarchical video segmentation, comprising:
    a processor coupled to a camera;
    wherein the processor executes:
    defining voxels over a spatio-temporal video;
    grouping into segments contiguous voxels that display similar characteristics including similar appearance or motion;
    determining a trajectory-based feature that complements color and optical flow cues, wherein trajectory cues are probabilistic histograms combinable in a graph-based framework; and
    applying a max-margin cue combination that learns a supervised distance metric for region dissimilarity that combines color, flow and trajectory features;
    generating a max-margin distance metric for video segmentation that combines a plurality of feature channels;
    determining feature representation $\phi(S)$ for a segment S as a stacked up histograms from all the individual cues;
    learning feature weighting as a linear combination $w^T|\phi(S_i)-\phi(S_j)|$, where an optimal weight $w^*$ is determined by solving an optimization problem of the form:

$$\min_{w,\xi_{ij}} \frac{1}{2}w^T w + \frac{\lambda}{N_+}\sum_{i,j}\xi_{ij}^+ + \frac{\lambda}{N_-}\sum_{i,j}\xi_{ij}^-$$

$$\text{s.t.} \quad y_{ij}w^T|\phi(s_i)-\phi(s_j)| \le 2y_{ij}-1+\xi_{ij}, \forall i,j$$

$$w \pm 0, \xi_{ij} \ge 0,$$

where $\xi_{ij}$ denote slack variables and $\lambda$ is a soft margin trade-off parameter, $N_+$ and $N_-$ are the number of pairs of segments that have the same or different ground truth label and $\xi_{ij}^+$, $\xi_{ij}^-$ are slack variables with respective membership in those positive or negative sets.

14. The method of claim 13, comprising representing trajectories as probabilistic histogram features.

15. The method of claim 13, comprising generating histogram-based features in a graph-based hierarchical segmentation.

* * * * *